(12) United States Patent
Laine et al.

(10) Patent No.: US 8,679,438 B2
(45) Date of Patent: Mar. 25, 2014

(54) PLASMA PROCESSES FOR PRODUCING SILANES AND DERIVATIVES THEREOF

(76) Inventors: Richard M. Laine, Ann Arbor, MI (US); Dean Richard Massey, Ann Arbor, MI (US); Peter Young Peterson, Saline, MI (US)

( * ) Notice: Subject to any disclaimer, the term of this patent is extended or adjusted under 35 U.S.C. 154(b) by 604 days.

(21) Appl. No.: 13/021,324

(22) Filed: Feb. 4, 2011

(65) Prior Publication Data

US 2011/0206591 A1 Aug. 25, 2011

(51) Int. Cl.
*C01B 33/04* (2006.01)

(52) U.S. Cl.
USPC ............................................ 423/347; 423/344

(58) Field of Classification Search
USPC .......................................... 423/347, 344, 324
See application file for complete search history.

(56) References Cited

U.S. PATENT DOCUMENTS 4,704,444 A * 11/1987 Brown-Wensley et al. .... 528/25

* cited by examiner

*Primary Examiner* — Edward Johnson

(74) *Attorney, Agent, or Firm* — Scherrer Patent & Trademark Law, P.C.; Stephen T. Scherrer

(57) ABSTRACT

The invention is generally related to process for generating one or more molecules having the formula $Si_xH_y$, $Si_xD_y$, $Si_xH_yD_z$, and mixtures thereof, where x,y and z are integers ≥1, H is hydrogen and D is deuterium, such as silane, comprising the steps of: providing a silicon containing material, wherein the silicon containing material includes at least 20 weight percent silicon atoms based on the total weight of the silicon containing material; generating a plasma capable of vaporizing a silicon atom, sputtering a silicon atom, or both using a plasma generating device; and contacting the plasma to the silicon containing material in a chamber having an atmosphere that includes at least about 0.5 mole percent hydrogen atoms and/or deuterium atoms based on the total moles of atoms in the atmosphere; so that a molecule having the formula $Si_xH_y$; (e.g., silane) is generated. The process preferably includes a step of removing one or more impurities from the $Si_xH_y$ (e.g., the silane) to form a clean $Si_xH_y$, $Si_xD_y$, $Si_xH_yD_z$ (e.g., silane). The process may also include a step of reacting the $Si_xH_y$, $Si_xD_y$, $Si_xH_yD_z$ (e.g., the silane) to produce a high purity silicon containing material such as electronic grade metallic silicon, photovoltaic grade metallic silicon, or both.

29 Claims, 7 Drawing Sheets

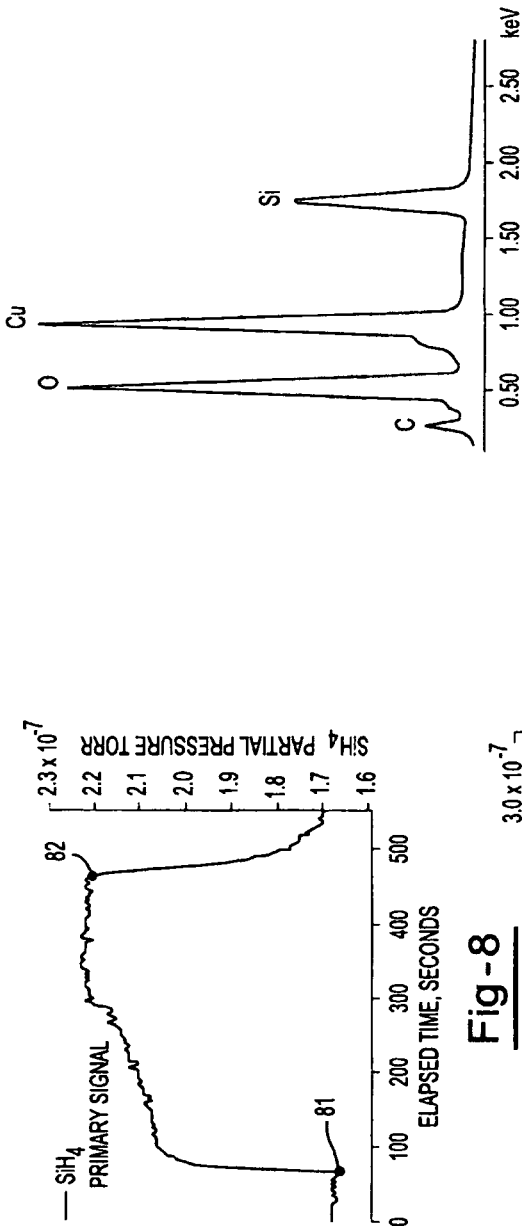
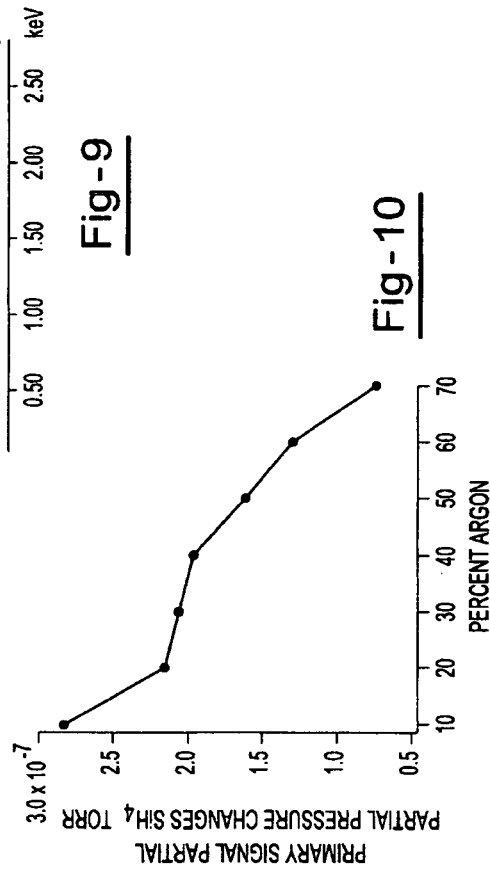
Fig-8
Fig-9
Fig-10

PLASMA PROCESSES FOR PRODUCING SILANES AND DERIVATIVES THEREOF

STATEMENT REGARDING FEDERALLY SPONSORED RESEARCH OR DEVELOPMENT

The invention was made with U.S. Government support under National Science Foundation Award No. IIP-0740871 and under the U.S. Department of Energy Contract No. DE-FG36-08GO18009. The Government has certain rights to the invention.

CLAIM OF PRIORITY

This application claims the benefit of the filing date under 35 U.S.C. 365(c) as a U.S. National Stage application of PCT Patent Application No. PCT/US09/52981, filed on Aug. 6, 2009, which claims the benefit under the Paris Convention of U.S. Provisional Application No. 61/086,546 filed on Aug. 6, 2008, each of which is incorporated herein by reference in its entirety.

FIELD OF THE INVENTION

The present invention pertains to improved processes for producing silane, and to process of forming silicon containing materials having a high purity, such as photovoltaic grade silicon, or electronic grade silicon, using the improved process for producing silane.

BACKGROUND OF THE INVENTION

Energy independence is a modern priority driven both by anticipated climatic changes due to global warming and ever-increasing reliance on imported hydrocarbon derived energy sources. The need for renewable, clean and abundant energy sources is obvious from the likes of solar energy, especially from silicon photovoltaics (PVs), which is high on the list. A factor preventing the more rapid adoption of silicon PVs is their current high cost driven in part by limited supplies of the photovoltaic grade silicon (i.e., "$Si_{pv}$") used to manufacture monocrystalline or polycrystalline wafers.

Although silicon is the second most abundant element in the earth's surface, highly purified silicon needed to make PV cells is expensive because of the energy intensive, complex, and costly processes currently used in its manufacture. The large capital costs involved means that $Si_{pv}$ production takes years to ramp up. In 2006, the demand, by volume, for $Si_{pv}$ exceeded the demand for semiconductor or electronics grade silicon (i.e., "$Si_{eg}$") for the first time. The few companies manufacturing $Si_{pv}$ are currently unable to meet growing customer demand thereby reducing the potential for rapid growth in solar energy.

Many $Si_{pv}$ and $Si_{eg}$ manufacturers rely on what is known as the Siemens Si purification process (i.e., "the quartz rock purification process") and modifications thereof. This process involves multiple steps starting from quartz rock and carbon sources to produce metallic metallurgical grade Si (i.e., "$Si_{mg}$"). $Si_{mg}$ is further processed to produce corrosive, toxic, and potentially polluting chlorosilanes that are then subject to several high-energy steps to produce $Si_{eg}$ or $Si_{pv}$.

Plasmas have been used to produce various materials, to adjust the surfaces of various materials, and for various test methods. Examples of these are described by:
1) F. Kail, A. Fontcuberta I Morral, A. Hadjadj, P. Roca I Cbarrocas, and A. Beorchia, "Hydrogen-plasma etching of hydrogenated amorphous silicon: a study by a combination of spectroscopic ellipsometry and trap-limited diffusion model", Phil. Mag., Vol. 84, No. 6, 595-609, 21 Feb. 2004;
2) Q. Wang, C. Z. Gu, J. J. Li, Z. L. Wang, C. Y. Shi, P. Xu, K. Zhu, and Y. L. Liu, "Enhanced photoluminescence from porous silicon by hydrogen-plasma etching", J. App. Phys., 97, 093501, 2005;
3) M. Dhamrin, N. H. Ghazali, M. S. Jeon, T. Saitoh, and K. Kamisako, "Hydrogen Plasma Etching Technique for Mono- and Multi-crystalline Silicon Wafers" 2006 IEEE World Conference on Photovoltaic Energy Conversion, Waikoloa, H A, May 2006; and
4) S. K. Singh, B. C. Mohanty, and S. Basu, "Synthesis of SiC from rice husk in a plasma reactor", Bull. Mater. Sci. Vol 25, No. 6, pp 561-563, November, 2002;
all of which are incorporated herein by reference.

Still, there remains a need in the art for alternative ways to produce high purity silicon materials, such as photovoltaic grade silicon metal and electronic grade silicon metal; and precursors thereof. For example there is a need for a process for producing a high purity silicon metal where the process is characterized as being simpler (e.g., requires fewer steps, such as fewer heating steps, uses one or more steps that are relatively fast; uses a relatively low processing temperature, or any combination thereof), more environmentally friendly, more energy efficient (e.g., at least 20 percent more energy efficient), or any combination thereof.

SUMMARY OF THE INVENTION

In an embodiment of the present invention, a process is provided. The process comprises the steps of: providing a silicon containing material; generating a plasma; and contacting the plasma to the silicon containing material in a chamber having an atmosphere that includes atoms selected from the group consisting of hydrogen atoms, deuterium atoms and a mixture thereof to form molecules selected from the group consisting of $Si_xH_y$, $Si_xD_y$, $Si_xH_yD_z$ and mixtures thereof, where x, y and z are integers $\geq 1$, H is hydrogen and D is deuterium.

In an embodiment, the molecules selected from the group consisting of $Si_xH_y$, $Si_xD_y$, $Si_xH_yD_z$ and mixtures thereof include molecules selected from the group consisting of silane, deuterated silane and mixtures thereof.

In an embodiment, the silicon containing material includes at least 20 weight percent silicon atoms based on the total weight of the silicon containing material.

In an embodiment, the step of contacting the plasma to the silicon containing material forms silicon atoms using a method selected from the group consisting of vaporizing silicon atoms, sputtering silicon atoms and combinations thereof.

In an embodiment, the atoms selected from the group consisting of hydrogen atoms, deuterium atoms and a mixture thereof come from molecules selected from the group consisting of hydrogen molecules, deuterium molecules, hydrogen deuteride molecules, hydrocarbons, deuterated hydrocarbons, and mixtures thereof.

In an embodiment, the process further comprises the step of: flowing a plasma input gas through a plasma generating device to generate the plasma, wherein the plasma input gas includes molecules selected from the group consisting of hydrogen molecules, deuterium molecules, hydrogen deuteride molecules, hydrocarbons, deuterated hydrocarbons and combinations thereof.

In an embodiment, the process further comprises the steps of: removing an output gas including molecules selected from the group consisting of silane, deuterated silane and mixtures thereof from the chamber; and separating the molecules from at least one impurity.

In an embodiment, the plasma is selected from the group consisting of a hydrogen plasma, a deuterium plasma and combinations thereof and further comprising the steps of: contacting the plasma with the silicon containing material to generate silicon gas; and reacting the silicon gas with a reactant selected from the group consisting of a hydrogen atom, a hydrogen molecule, a hydrogen ion, a deuterium atom, a deuterium molecule, a hydrogen deuteride molecule, a deuterium ion, a hydrocarbon, a deuterated hydrocarbon and combinations thereof to at least one molecule consisting of a silicon atom and one or more atoms selected from the group consisting of hydrogen atoms and deuterium atoms.

In an embodiment, the silicon containing material includes a metal containing at least about 50 mole percent silicon atoms.

In an embodiment, the chamber has an atmosphere including at least about 1 mole percent atoms selected from the group consisting of hydrogen atoms and deuterium atoms.

In an embodiment, the process further comprises the step of: feeding a background gas into the chamber wherein the background gas includes atoms selected from the group consisting of hydrogen atoms, deuterium atoms and combinations thereof.

In an embodiment, the plasma input gas comprises at least about 90 mole percent atoms selected from the group consisting of hydrogen atoms, deuterium atoms and combinations thereof.

In an embodiment, the chamber has an atmosphere containing less than about 20 weight percent oxygen.

In an embodiment, the chamber has an atmosphere including an absolute partial pressure of molecules selected from the group consisting of hydrogen molecules, deuterium molecules, hydrogen deuteride molecules and mixtures thereof greater than about 0.001 kPa.

In an embodiment, The process of claim 1, wherein the chamber has an atmosphere having an absolute pressure from about 0.001 kPa to about 10 MPa.

In an embodiment, the process further comprises the steps of: condensing the molecules selected from the group consisting of silane, deuterated silane and combinations thereof, wherein the at least one impurity is selected from the group consisting of hydrogen molecules, deuterium molecules, hydrogen deuteride molecules and mixtures thereof; and re-circulating the at least one impurity into the chamber.

In an embodiment, the process further comprises the step of converting the molecules selected from the group consisting of $Si_xH_y$, $SI_xD_y$, $Si_xH_yD_z$ and mixtures thereof into high purity silicon.

In an embodiment, the process further comprises the step of: increasing the concentration of silane gas in the atmosphere of the chamber by at least 0.01 mole % based on the total number of atoms in the atmosphere of the chamber.

In an embodiment, the chamber has an atmosphere that contains less than about 60 weight percent nitrogen.

In an embodiment, the plasma input gas includes an inert gas present at a concentration of at least about 0.01 mole percent, based on the total concentration of atoms in the plasma input gas, wherein the inert gas includes atoms selected from the group consisting of helium, neon, argon, krypton, and xenon.

In an embodiment, the chamber has an atmosphere that includes at least about 0.01 percent inert gas atoms.

In an embodiment, the plasma input gas has a total concentration of atoms selected from the group consisting of hydrogen atoms, deuterium atoms and combinations thereof, and inert gas atoms greater than about 90 mole percent.

In an embodiment, the process further comprises the step of feeding particles of the silicon containing material into a plasma torch, wherein the particles have a mean volume of less than 0.1 ml.

In an embodiment, the silicon containing material further comprises a hydrocarbon.

In an embodiment, the process further comprises the step of: feeding a hydrocarbon material in a condensed state into a plasma torch.

In an embodiment, the hydrocarbon material has a mean particle volume of less than 0.1 ml.

In an alternate embodiment of the present invention, a method for providing a high purity silicon is provided. The method comprises the steps of: providing an agricultural waste product having amorphous silica, carbon, and impurities; extracting from the agricultural waste product an amount of the impurities; changing the ratio of carbon to silica, thereby forming a cleaned agricultural waste product having a ratio of carbon to silica that ranges from about 2:1 to about 10:1; and reducing the silica to form a photovoltaic silicon, wherein in the reducing step, the cleaned agricultural waste product is exposed to a hydrogen plasma to form silane.

In a further alternate embodiment of the present invention, a process for generating a molecule selected from the group consisting of the formula $Si_xH_y$, $Si_xD_y$, $Si_xH_yD_z$, and mixtures thereof, where x,y and z are integers ≥1, H is hydrogen and D is deuterium, is provided. The process comprises the steps of: providing a silicon containing material, wherein the silicon containing material includes metallic silicon, an agricultural waste product or other silicon containing material; and contacting a plasma to the silicon containing material in an environment with an appreciable content of atoms selected from the group consisting of hydrogen, deuterium and mixtures thereof to generate the molecule, wherein the plasma is capable of vaporizing a silicon atom, sputtering a silicon atom, or both.

In a still further alternate embodiment of the present invention, a process for generating silane is provided. The process comprises the steps of: flowing a gas containing atoms selected from the group consisting of hydrogen atoms, deuterium atoms, and mixtures thereof through a plasma generating device to generate a plasma selected from the group consisting of a hydrogen plasma, a deuterium plasma and a combination thereof; contacting the plasma with a silicon containing material to generate silicon gas; and reacting the silicon gas with at least one hydrogen atom, at least one hydrogen molecule, at least one hydrogen ion, at least one deuterium atom, at least one deuterium molecule, at least one hydrogen deuteride molecule, at least one deuterium ion or any combination thereof, to form one or more molecules consisting of at least one silicon atom and at least one hydrogen atom or at least one deuterium atom, wherein the gas has at least 0.5 percent hydrogen atoms, deuterium atoms or a combination thereof based on the total number of atoms in the gas.

BRIEF DESCRIPTION OF THE DRAWINGS

FIG. 8 is a plot illustrating the silane concentration in a chamber as a function of time.

FIG. 9 is an X-ray spectrometry plot illustrating the presence of silicon on witness plates.

FIG. 10 is a plot illustrating the silane concentration in a chamber as a function Argon concentration.

DETAILED DESCRIPTION OF THE INVENTION

Definitions

Figure 1:
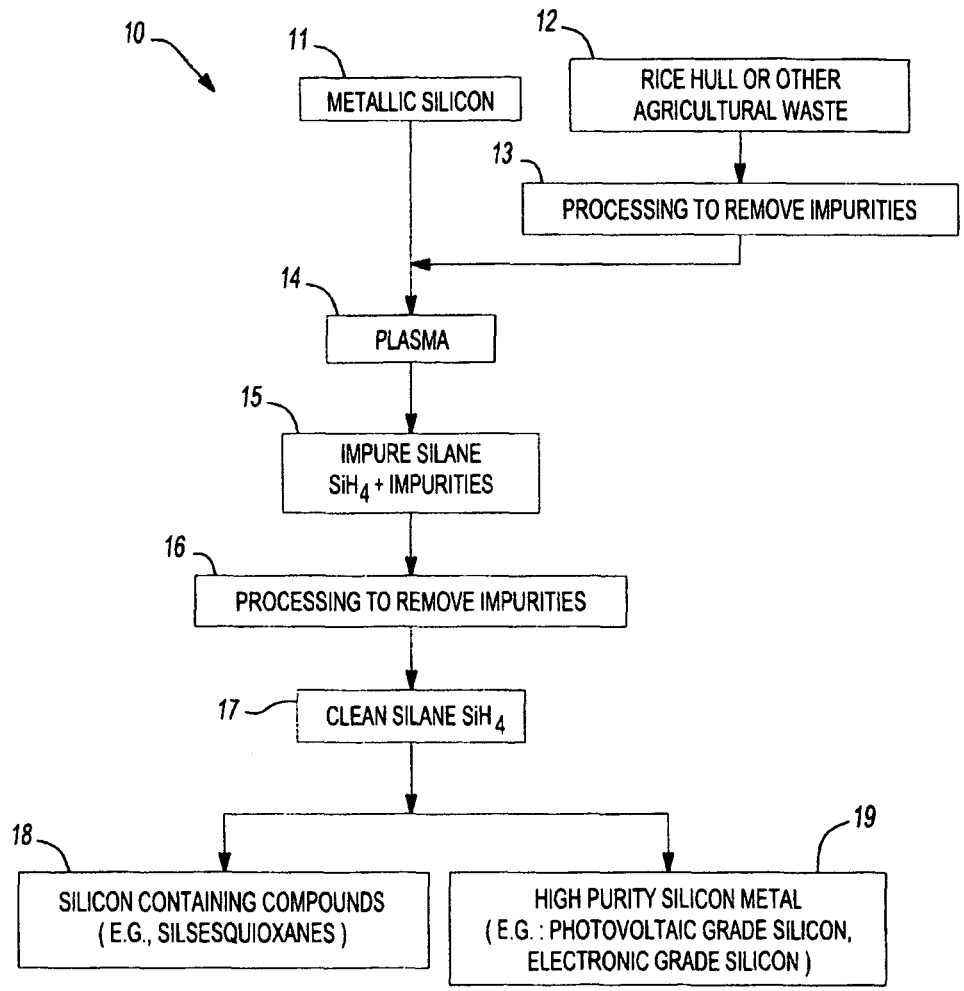
FIG. 1 is an illustrative flow chart of a process for producing high purity materials.

As used herein, unless otherwise defined, the following terms have the definitions listed below:

$Si_{mg}$ means Metallurgical Grade Silicon having a silicon concentration greater than about 98 weight percent (for example from about 98 weight percent to about 99.9 weight percent).

Upgraded $Si_{mg}$ means Upgraded Metallurgical Grade Silicon having a silicon concentration greater than about 99.9 weight percent (for example from about 99.9 weight percent to about 99.999 weight percent).

$Si_{pv}$ means Photovoltaic Grade Silicon having a silicon concentration greater than about 99.999 weight percent (for example from about 99.999 weight percent to about 99.99999 weight percent).

$Si_{eg}$ means Electronics Grade Silicon having a silicon concentration greater than about 99.99999 weight percent (for example about 99.9999999 weight percent).

High purity silicon is silicon having a Si concentration greater than about 98 weight percent, preferably greater than about 99.9 weight percent, more preferably greater than about 99.99 weight percent, even more preferably greater than about 99.999 weight percent, and most preferably greater than about 99.9999 weight percent).

High purity silane is silane having a $SiH_4$ concentration greater than about 98 weight percent, preferably greater than about 99.9 weight percent, more preferably greater than about 99.99 weight percent, even more preferably greater than about 99.999 weight percent, and most preferably greater than about 99.9999 weight percent).

The invention, in its various aspects, addresses a need for an improved process for manufacturing high purity silicon materials, such as one or molecules having the general formula $Si_xH_y$, $Si_xD_y$, $Si_xH_yD_z$, where x, y and z are integers ≥1 (e.g., silane), and materials that may be derived therefrom (e.g., photovoltaic grade silicon, electronic grade silicon, or both). Depending on the gas and the silicon containing material employed, the process may include various steps of separating one or more products of the reaction.

It should be noted that throughout the specification, although reference is made to hydrogen gas, hydrogen ions, hydrogen atoms, and hydrocarbons, the present invention is intended to also include stable isotopes of hydrogen, specifically deuterium, and ions, atoms, and molecules including the deuterium isotope, where deuterium is represented by the symbol "D". For example, hydrogen gas should also be construed to include the deuterated forms thereof, such as deuterium gas ($D_2$) and hydrogen deuteride (HD). Moreover, deuterated molecules, such as deuterated hydrocarbons, wherein one or more hydrogen in the hydrocarbons may have a deuterium atom in its place, may be utilized in the present invention, and where the term "hydrocarbon" is used, deuterated forms thereof are contemplated. Specific types of plasmas are also specified in the present invention as including hydrogen plasmas or hydrogen gas plasmas; however, deuterated plasmas may also be utilized. Finally, the invention provides for the manufacture of high purity silicon materials, such as one or molecules having the general formula $Si_xH_y$, wherein x and y are integers ≥1 (e.g., silane). However, where applicable, deuterated forms of this molecule, such as $Si_xD_y$ and $Si_xH_yD_z$, where x, y and z are integers ≥1, where H is hydrogen and D is deuterium are also contemplated, and may be produced via the methods and processes described herein.

As illustrated in FIG. 1, the process may include a step of providing a source of silicon, such as metallic silicon 11, an agricultural waste product 12 (such as rice hulls), or a combination thereof. If an agricultural waste product is employed, the process may include one or more steps of removing impurities 13 from the agricultural waste product. The silicon containing material is then exposed to a plasma 14 and impure silane 15 (i.e., a mixture of silane and other compounds, such as residual gas molecules from the plasma or otherwise present in the chamber where the silicon containing material is exposed to the plasma, other reaction products, or any combination thereof) is generated. The process may include one or more steps of removing the impurities 16 (i.e., the other compounds) from the silane, so that a clean (i.e., high purity) silane 17 is obtained. Optionally, the process may include a step of converting the silane into a high purity silicon metal 18, such as an electronics grade or photovoltaic grade silicon. Optionally, the process may include a step of converting the silane into a silicon containing compound, such as a silsesquioxane, or a derivative, thereof.

Silicon Containing Material

The various aspects of the invention will employ a silicon containing material from which a high purity product is produced. The silicon containing material may be any material that contains a significant quantity of silicon atoms. The concentration of silicon atoms in the silicon containing material is preferably greater than about 10 mole percent, more preferably greater than about 20 mole percent, even more preferably greater than about 40 mole percent and most preferably greater than about 60 mole percent, based on the total number of atoms in the silicon containing material The silicon in the silicon containing material may be provided as silicon metal, in any chemical compound containing silicon, or both. Without limitation, exemplary silicon containing material that may be used in the present invention include materials that contain a silica (i.e., $SiO_2$), a silicon metal, a metal alloy containing silicon atoms (preferably containing at least 20 weight percent silicon atoms, 20 mole percent silicon atoms, or both), a silicate, silicon carbide, a silicon polymer, and the like, or any combination thereof. Examples of silica containing materials include quartz, silica, sand, and various agricultural waste products such as rice hulls. Silicon metals typically contain at least 90 weight percent silicon, more preferably at least 95 weight percent silicon, and most preferably at least 98 percent silicon. However, silicon metals containing lower concentrations of silicon atoms may also be used. Metal alloys containing silicon may have at least about 50 mole percent silicon atoms, preferably at least about 70 mole percent silicon atoms, more preferably at least about 90 mole percent silicon atoms, even more preferably at least about 95 mole percent silicon atoms, and most preferably at least about 99 mole percent silicon atoms).

Although a relatively high purity silicon (e.g., containing greater than 99.9 weight percent silicon) may be employed in the present invention, the benefits are more evident when starting with a relatively low purity silicon (e.g., containing less than 99.9 weight percent silicon, preferably less than about 99.5 weight percent silicon, and most preferably less than about 99 weight percent silicon).

Various agricultural materials, such as corn husk and rice hulls, that include substantial quantity of silica may also be employed. The concentration of silica in these materials may be increased by burning or coking these materials. As such, it is contemplated that the silicon containing material may include a raw agricultural waste (such as corn husk and rice hulls), an ash from burning a raw agricultural waste containing silica (e.g., corn husk ash and rice hull ash), or a product of coking other raw agricultural waste containing silica (e.g., coked corn husks and coked rice hulls). Examples of agricultural materials that may be employed include those described in PCT Patent Application No. PCT/US09/52965, filed on Aug. 6, 2009 (entitled "LOW COST ROUTES TO HIGH PURITY SILICON AND DERIVATIVES THEREOF", by Laine, Marchal, McColm and Krug), incorporated herein by reference. Such materials typically include amorphous silica, carbon, and impurities. The agricultural waste product may be a rice hull ash, or other agricultural waste product ash that has undergone one or more steps described in PCT Patent Application No. PCT/US09/52965, incorporated herein by reference, such as one or more steps or removing impurities; one or more steps of extracting (e.g., partially extracting) silica; one or more steps of washing in boiling water; one or more steps of combining with silica, clean carbon, a binder, or any combinations thereof; one or more steps of compacting the material; or any combination thereof. If an agricultural waste product such as rice hull ash is employed, it will be appreciated that in addition to $Si_xH_y$ compounds where x and y are integers ≥1 (e.g., silane), carbon containing compounds such as a hydrocarbon (e.g., methane), a methylsilane (e.g., $CSiH_6$), or both, may be produced. For example, the process may include a step of reducing the concentration of impurities in the agricultural waste product, such as a step of acid washing the agricultural waste product (e.g., using an aqueous acid solution containing from about 3 to about 36 weight percent acid) so that impurities, including metal impurities in the agricultural waste products are reduced or eliminated; a step of changing the ratio of carbon to silica using a step of partially extracting silica from the agricultural waste product (e.g., to generate a clean agricultural waste product, such as a porous material having a BET surface area greater than about 100 $m^2$/g) using a solution including an ammonium hydroxide; a step of washing the agricultural waste product in boiling water; a step of compacting the agricultural waste product (e.g., so that the bulk density is greater than about 0.9 g/$cm^3$); or any combination thereof. When exposed to a plasma, the silica in an agricultural waste product may be reduced (e.g., to produce silane gas). If employed, the agricultural waste product as a ratio of carbon to silica preferably greater than about 0.2:1, more preferably greater than 0:5:1, and most preferably greater than 2:1. Suitable agricultural waste product preferably contains a high concentration of silicon. As such, the carbon to silica ratio of the agricultural waste product is preferably less than about 10:1, more preferably less than about 5:1, and most preferably less than about 3:1.

Contacting a Plasma to the Silicon Containing Material

The process includes a step of contacting a plasma (such as a plasma including a hydrogen plasma, an inert gas plasma, or both) to the silicon containing material so that a molecule having the chemical structure $Si_xH_y$, $Si_xD_y$, and $Si_xH_yD_z$, where x, y and z are integers ≥1, H is hydrogen and D is deuterium, is generated. The generation of the $Si_xH_y$, $Si_xD_y$, and/or $Si_xH_yD_z$ molecule may be considered to occur in a reaction including a first step of removing a silicon atom form the silica containing material and a second step of contacting the silicon atom with at least one hydrogen atom, at least one hydrogen molecule, or at least one hydrogen ion, at least one deuterium molecule, at least on hydrogen deuteride molecule, at least one deuterium atom ion, or any combination thereof, so that the $Si_xH_y$, $Si_xD_y$, and $Si_xH_yD_z$ molecule is generated. However, other mechanisms may also be possible and are within the scope of the invention.

Without being bound by theory, it is believed that the step of removing a silicon atom from the silicon containing material (e.g., from a surface of the silicon containing material) may include a step of sputtering silicon atoms, a step of vaporizing silicon atoms, or both. As such the plasma preferably contains at least one component (for example at least one ion) that has sufficient energy (such as kinetic energy, potential energy, thermal energy, chemical energy or otherwise) that it may effect the removal of a silicon atom from the silicon containing material. The removed silicon atoms preferably are in the form of a silicon ion, a monoatomic silicon gas, or both.

If employed, the step of sputtering silicon atoms may include a step of sputtering silicon atoms with an ion. The ions used for sputtering typically have sufficient kinetic energy to effect the sputtering of the silicon atoms. It will be appreciated that in a plasma, ions having higher mass will generally have higher kinetic energy. As such, some or even all of the ions used for sputtering the silicon atoms preferably have an atomic mass greater than about 9 atomic mass units.

Plasma Generating Device

The plasma for the above reaction may be generated using any plasma generating device that can produce a plasma (e.g., convert a gas, liquid, or solid into a plasma) containing a hydrogen plasma, and preferably can produce a hydrogen containing plasma that has sufficient energy to remove silicon atoms from the silicon containing material. Without limitation, the plasma generating device may be an RF Plasma device, such as an inductively coupled plasma device (e.g., a magnetron plasma, an inductively coupled plasma torch, a solenoid coil plasma device, a planar coil plasma device, a helical resonator, or any combination thereof), a capacitively coupled plasma device (e.g., a single-frequency capacitively coupled plasma or a dual-frequency capacitively coupled plasma), an electrodeless plasma excitation device (e.g., a microwave plasma device, a dielectric barrier discharge device, or a laser), or any combination thereof. Other plasma generating devices that may be employed include direct current (DC) plasma device, such as a thermal arc device, a non-thermal arc device, a magneto-static discharge device, or an electrostatic discharge device, or any combination thereof. The plasma generating device may include both an RF plasma generating device and a DC plasma generating device. For example the plasma generating device may include first a RF plasma device that acts as a pilot to start a second (e.g., the principle) plasma generating device (e.g., a DC thermal arc device). It will be appreciated that other plasma generating devices may also be employed. A particularly preferred plasma generating device is one that includes a plasma torch.

Figure 2:
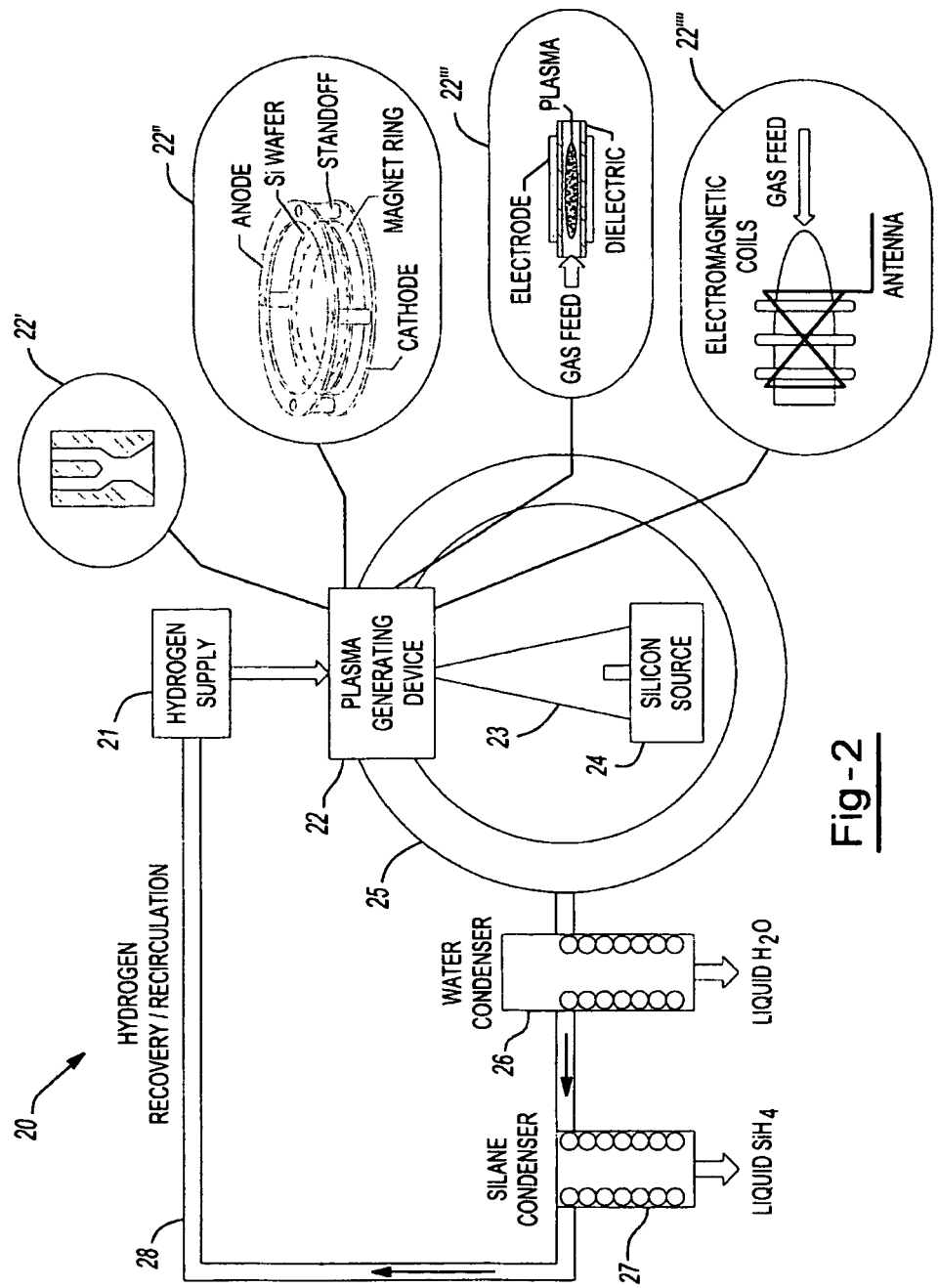
FIG. 2 is a schematic drawing illustrating various aspects of a process for generating silane using a plasma.

FIG. 2, illustrates various aspects of a process for generating silane 20. The process includes supplying a gas including hydrogen atoms 21 to a plasma generating device 22. As further discussed below, the gas may additionally include one or more other atoms, (e.g., atoms of an inert gas, such as argon, or atoms of a polyatomic gas including hydrogen such as methane). Exemplary plasma generating devices that may be employed include a plasma torch 22', a magnetron plasma device 22", a dielectric barrier discharge device 22''' and a helicon plasma device 22''''. The plasma generating device may be in a chamber 25 or have a fluid connection to the chamber so that the plasma 23 can be directed to a surface of the silicon containing material 24 that is placed in the chamber. As stated above, the plasma reacts with the silicon containing material to produce silane. Depending on the chemistry of the silicon containing material and the gas, one or more additional products may be generated. For example, if the silicon containing material includes silica, the process may additionally generate water. As such, the process may optionally include a step of condensing water 26, so that it may be removed from the gas stream. The process typically will include a step of condensing the silane 27, to produce a relatively pure liquid. The process may also optionally include one or more steps of recirculating and/or recovering 28 the remaining hydrogen-containing gas.

Figure 3:
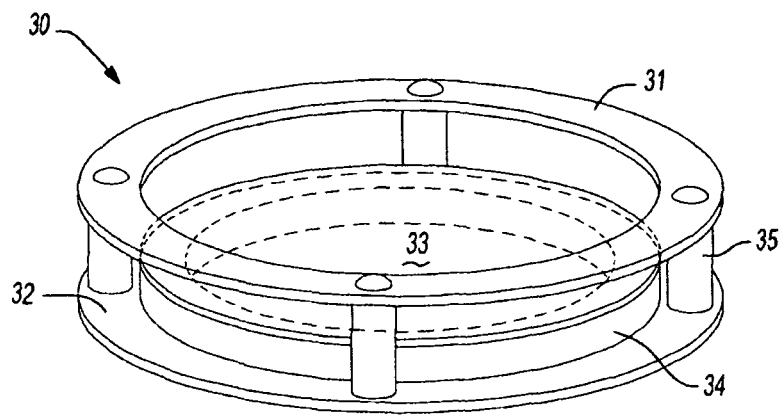
FIG. 3 is a schematic drawing illustrating various aspects of a plasma generating device.

In one aspect of the invention, the plasma generating device may include a magnetron plasma generating device, such as a device as illustrated in FIG. 3. A magnetron plasma device 30 may include an anode 31 and a cathode 32, located in a chamber and separated by one, two, or more standoffs 35. The magnetron plasma device includes a magnetic ring 34 that produces an axial magnetic field and may be generally parallel to, and located between the anode and the cathode. The silicon containing material 33 is placed between the anode and cathode (e.g., between the magnetic ring and the anode). The chamber is evacuated and filled with the gas containing hydrogen atoms. A potential is applied to the anode and cathode so that a plasma is formed that directed at a surface of the silicon containing material.

Plasma Gas

The process may include a step of feeding a plasma input gas such as a hydrogen-containing gas (e.g. into a plasma generating device, into a chamber containing the plasma generating device, or both). As previously described, the process includes a step of forming a plasma from a gas that may contain hydrogen atoms and/or deuterium atoms. If employed, the hydrogen-containing gas includes hydrogen atoms at a concentration preferably greater than 0.5 mole percent, more preferably greater than about 1 mole percent, even more preferably greater than about 1.5 mole percent hydrogen atoms, even more preferably greater than about 2 mole percent hydrogen atoms, and most preferably greater than 2.5 mole percent, based on the total moles of atoms in the gas. Without limitation, the hydrogen-containing gas may include molecular hydrogen, one or more hydrocarbons (e.g., one or more hydrocarbons having from 1 to 20 carbon atoms, having a boiling point less than about 20° C., or both), or any combination thereof. Exemplary hydrocarbons which may be used (in addition to, or in place of molecular hydrogen) include methane, ethane, propane, butane, pentane, hexane, cyclohexane, cyclohexene, styrene, ethylene, propylene, butene, pentene, hexene, benzene, methyl styrene, xylene, or any combination thereof.

In one aspect of the invention, the plasma input gas includes, consists substantially of, or consists entirely of hydrogen molecules. For example, the hydrogen-containing gas preferably contains at least about 90 mole percent hydrogen atoms, more preferably at least about 95 mole percent hydrogen atoms, even more preferably at least about 98 mole percent hydrogen atoms, and most preferably at least about 99 mole percent hydrogen atoms.

The plasma input gas may include, or consist essentially of one or more inert gases. If employed the concentration of the inert gas may be at least about 0.01 mole percent, preferably at least about 0.1 mole percent, more preferably at least about 0.5 mole percent, and most preferably at least about 1 mole percent, based on the total concentration of atoms in the plasma input gas. Any inert gas which may effect the removal of silicon atoms from a silicon containing material may be used. Without limitation, the inert gas molecules preferably includes helium, neon, argon, krypton, xenon, or any combination thereof. The plasma input gas may include both molecular hydrogen and one or more inert gases. The total concentration (in mole percent of atoms) of the molecular hydrogen and the inert gas preferably is greater than about 90 mole percent, more preferably greater than about 95 mole percent, even more preferably greater than about 99 mole percent, and most preferably greater than about 99.9 mole percent. For example, the plasma input gas may be a hydrogen-containing gas that consists essentially of molecular hydrogen and one or more inert gases.

The plasma input gas preferably is substantially free of (e.g., containing less than 5 mole percent, less than 1 mole percent, or less than 0.1 mole percent on a molecular basis), or entirely free of oxygen, nitrogen, other molecules that may react with hydrogen (e.g., $H_2$ (g), H (g), $H^+$ (g)), or any combination thereof.

The plasma input gas preferably includes hydrogen atoms. If the plasma input gas does not include hydrogen atoms, the process will generally include a means of inputing hydrogen atoms into the chamber (e.g., using a background input gas as described below).

The process may also include a step of inputting a background input gas into the chamber, such that the background input gas is not fed directly into or through the plasma generating device. Any of the gases described herein for the plasma input gas may also be used in the background input gas.

For purposes of illustration, an example of the use of a background is described as follows: A process may include a plasma input gas that is fed directly into a plasma torch where the plasma input gas consists essentially of an inert gas and the plasma from the torch exits directly into a chamber containing a silicon containing material. In this example, the process may include a step of additionally feeding a background input gas (e.g., through an inlet) into the chamber. Here the background gas may include, or even consist entirely of one or more hydrogen containing molecules, so that the atmosphere in the chamber will include hydrogen atoms (e.g. at least 0.5 mole percent hydrogen atoms). As such, the plasma may primarily include the inert gas. However, it will be appreciated that some of the hydrogen containing molecules will interact with the plasma so that the plasma will include hydrogen plasma.

Pressure

The plasma generating device may be operate at any pressure (i.e. absolute pressure) wherein silane molecules may be produced. Preferably the plasma generating device is operated at a relatively high pressure so that a relatively high concentration of hydrogen atoms is present for contacting with the silicon gas to generate silane. When the pressure is very high, the plasma may interact with background molecules before it can contact the silicon containing material. As such, there may be an optimal pressure (e.g., a pressure that results in a maximum rate of silane generation) for the process, or a range of pressures for which the process will generate silane gas at a desirable rate. The optimal pressure, the pressure range, or both may depend on the plasma generating process, the operating conditions, the composition of the hydrogen containing gas, the distance between the silicon containing material and the plasma generating device and the like. The step of contacting the plasma containing a hydrogen plasma with the silicon containing material to generate silane preferably occurs at an absolute pressure greater than about 0.001 kPa, more preferably greater than about 0.2 kPa, even more preferably greater than about 10 kPa, even more preferably greater than about 50 kPa, even more preferably greater than about 100 kPa, and most preferably greater than about 150 kPa. The step of contacting the plasma containing a hydrogen plasma with the silicon containing material to generate silane occurs at an absolute pressure that is preferably less than about 10 MPa, more preferably less than about 6 MPa, and most preferably less than about 3 MPa. Higher pressures may also be used.

Atmosphere

The atmosphere in the chamber containing the silicon containing material (e.g., where the $Si_xH_y$ is generated) is preferably a controlled atmosphere. For example the chamber may contain an atmosphere having less than about 20 weight percent oxygen, preferably less than about 10 weight percent oxygen, and most preferably less than about 8 weight percent oxygen.

The chamber where the silicon containing material contacts the plasma (e.g., to generate silane) preferably has an atmosphere containing a relatively low concentration of nitrogen gas. For example, the concentration of nitrogen in the chamber is preferably less than about 60 weight percent, and more preferably less than about 30 weight percent, based on the total weight of the gas in the chamber.

The atmosphere in the chamber preferably includes an inert gas. The inert gas, if present, may have a concentration greater than about 0.01 mole percent, more preferably greater than about 0.1 mole percent, and most preferably greater than about 0.3 mole percent, based on the total number of moles of atoms in the atmosphere of the chamber.

The atmosphere in the chamber preferably includes one or more molecules containing hydrogen atoms. The hydrogen atoms, if present, may have a concentration greater than about 0.01 mole percent, more preferably greater than about 1 mole percent, and most preferably greater than about 5 mole percent, based on the total number of moles of atoms in the atmosphere of the chamber.

The atmosphere in the chamber may include molecular hydrogen having a partial pressure (i.e., an absolute partial pressure) greater than about 0.001 kPa (preferably greater than about 0.2 kPa, more preferably greater than about 10 kPa, even more preferably greater than about 50 kPa, even more preferably greater than about 100 kPa, and most preferably greater than about 150 kPa). The chamber may include an atmosphere having a partial pressure of molecular hydrogen less than about 10 MPa (preferably less than about 6 MPa, and more preferably less than about 3 MPa).

The plasma generating device and the process for generating silane may operate at a wide range of chamber temperatures. The chamber temperature is greater than about −200° C., more preferably greater than 0° C. and most preferably greater than about 20° C. The chamber temperature is preferably less than about 1200° C., more preferably less than about 1000° C., and most preferably less than abut 600° C.

The process disclosed herein may be used to produce a clean silane, such as a silane having a purity that is preferably greater than 99 weight percent, more preferably greater about 99.9 weight percent, even more preferably greater than about 99.99 weight percent and most preferably greater than about 99.999 weight percent.

As described above, the process may further comprise a step of converting the silane gas into high purity silicon (e.g., a silicon having a concentration of silicon atoms greater than about 99.9 weight percent, preferably greater than about 99.99 weight percent, even more preferably greater than about 99.999 weight percent, more preferably greater than about 99.9999 weight percent, and most preferably greater than about 99.99999 weight percent). The high purity silicon may be amorphous, crystalline (e.g., single crystalline, or polycrystalline), or both.

Figure 4:
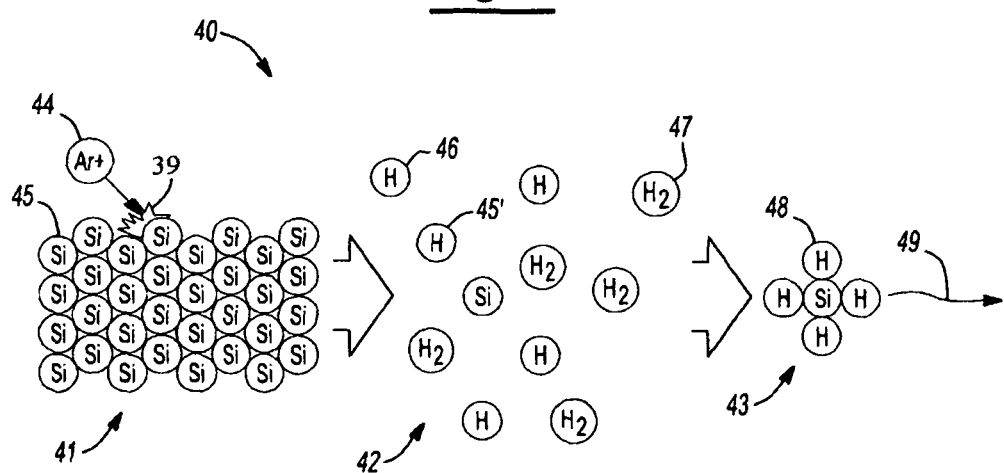
FIG. 4. illustrates various chemical and physical reactions that may be used to generate silane.

With reference to FIG. 4, the process may include a step of sputtering 41 a silicon atom 45 from a silicon containing material with a plasma 44 including an inert gas (e.g., an argon ion) and hydrogen atoms. Without being bound by theory, it is believed that the inert gas transfers energy to the silicon atom and causes it to be removed 46 from the solid, so that the removed silicon atom is in a gas state (i.e., Si(g)) 45'. The process may further includes a step of contacting 42 the silicon gas with hydrogen (e.g., monoatomic hydrogen 46, hydrogen molecules 47, or both, to form silane 48. The step or contacting may include one or more intermediate steps, such as a step of reacting the silicon gas to form one or more molecules consisting of one or more silicon atoms (e.g., one silicon atom) and one or more (e.g., two) hydrogen atoms. The process may also include a step of condensing 49 or otherwise separating the silane 43 from the other compounds in the system (e.g., from the other gases).

Figure 5:
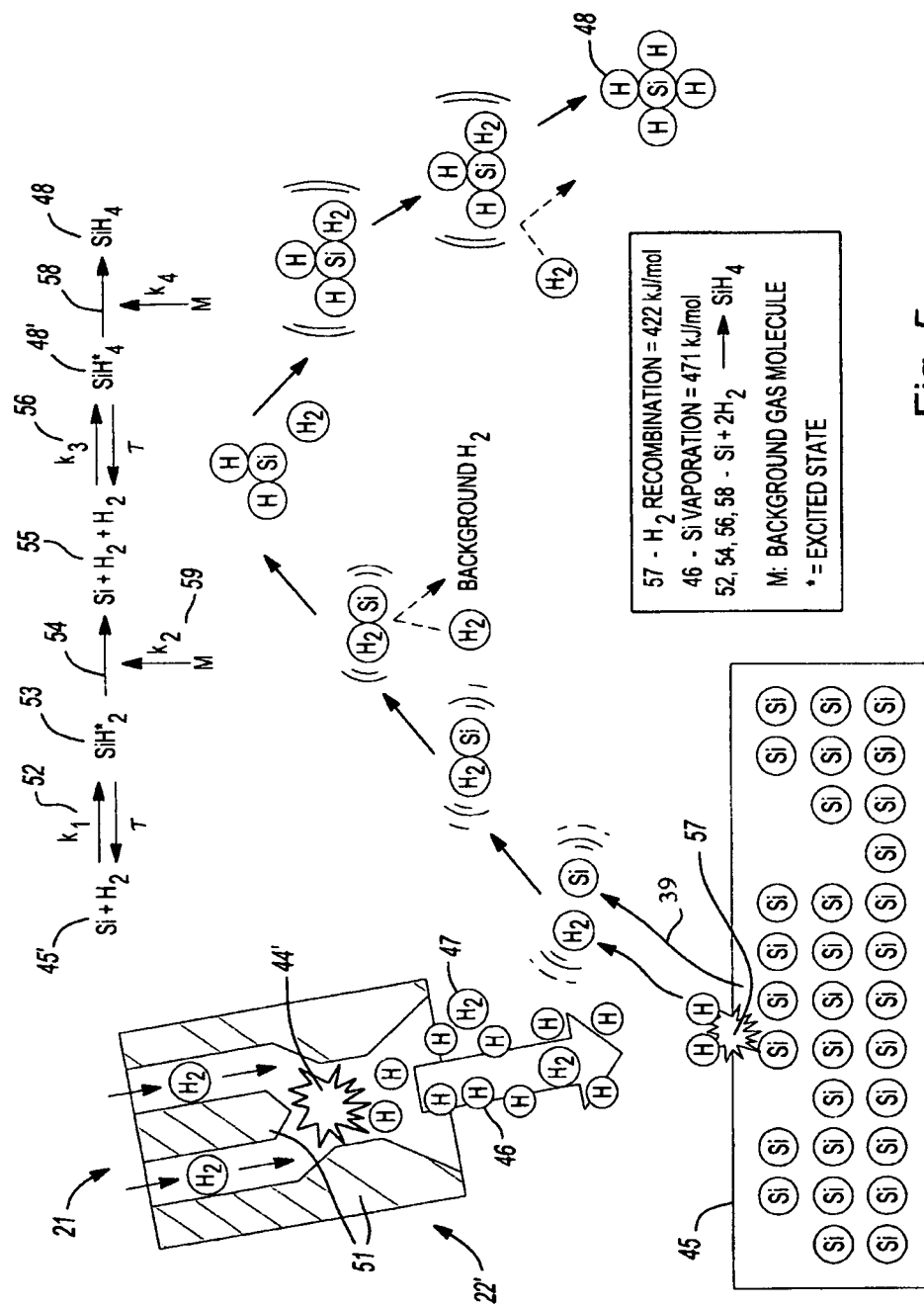
FIG. 5 is a schematic drawing of an illustrative plasma generating device and various chemical and physical reactions that may be used to generate silane.

With reference to FIG. 5, the process may include a step of feeding a plasma input gas, such as one including a source of hydrogen atoms (e.g., a gas including hydrogen atoms, such as $H_2$) into a plasma torch. In addition to feeding the source of hydrogen atoms into a plasma torch, the process may optionally include feeding a source of silicon atoms, such as particles of a silicon containing material into the plasma torch (not illustrated) and the plasma torch may be any art known plasma torches that is capable of delivering a powder. As illustrated in FIG. 5, the plasma torch may have two or more electrodes for generating a plasma 44' including monoatomic hydrogen 46, and hydrogen molecules 47. The process may include a step of removing silicon atoms by vaporizing silicon from the silicon containing material. The step of vaporization may be effected by first combining two hydrogen atoms to form a hydrogen molecule 57 (e.g., a step that release over 400 kJ/mole of thermal energy), and then transferring thermal energy (e.g., thermal energy from the step of recombining two hydrogen atoms) from the hydrogen molecule to a silicon atom 45. The transferred energy may cause the silicon atom to vaporize 46, so that it is a Si(g) 45'. Without being bound by theory, it is believed that this aspect of the invention may be characterized by one or any combination of the following steps: reacting 52 the Si(g) with a hydrogen molecule 47 to form an excited $SiH_2$ molecule 53; Transferring 54 some of the energy in the excited $SiH_2$ molecule to a background molecule (M) 59, so that the $SiH_2$ molecule is no longer in an excited state 55, reacting 56 the unexcited $SiH_2$ molecule with a second hydrogen molecule to form an excited silane molecule 48'; or a second step of transferring energy from the excited molecule to 58 to another background molecule 59, so that an unexcited silane molecule is generated 48. As described above the process may include a step of contacting and/or reacting a plasma including a hydrogen plasma with a silicon gas to form one or more different molecules each consisting of one or more silicon atoms and one or more hydrogen atoms.

Separating Gases

Figure 6:
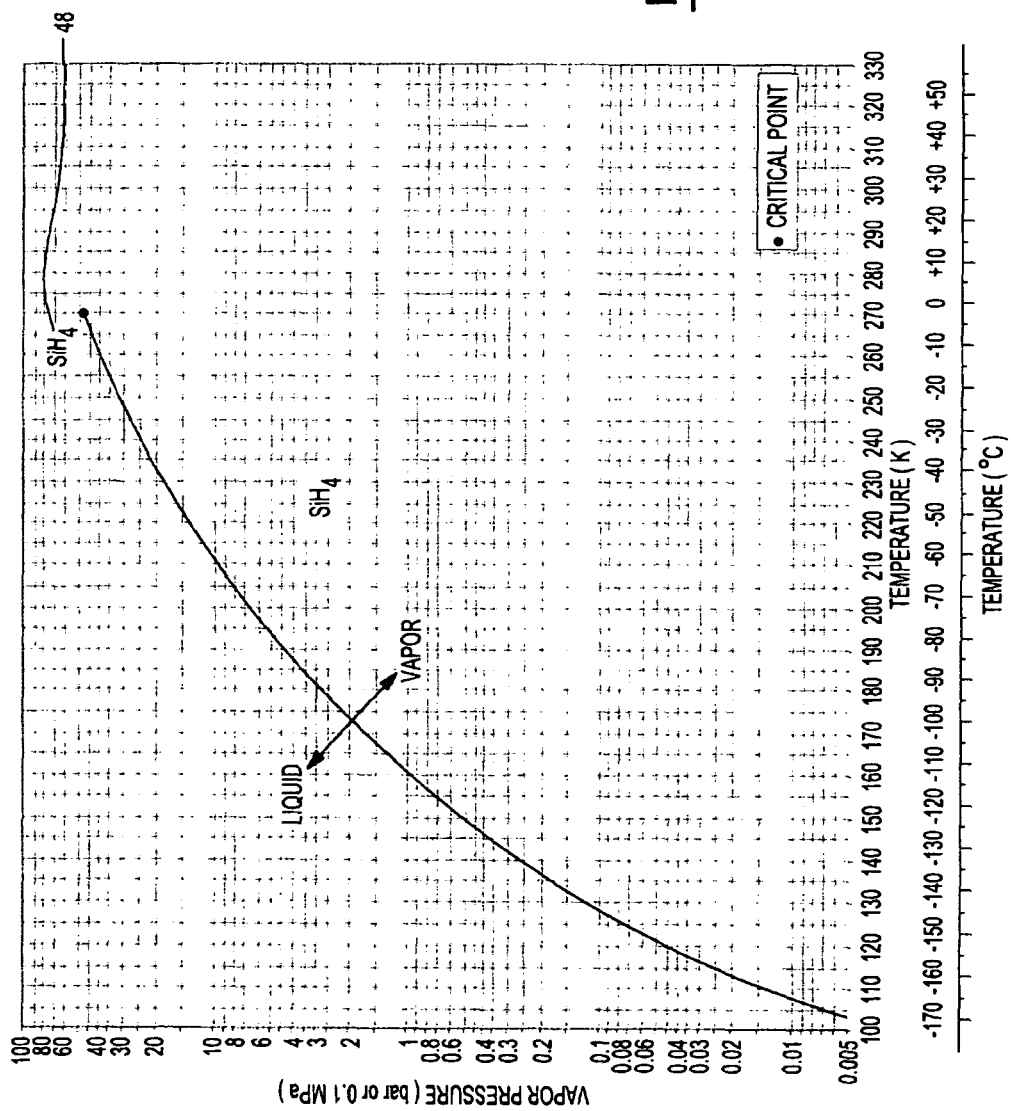
FIG. 6 is a plot illustrating the liquid-gas transition temperatures of silane.
Figure 7:
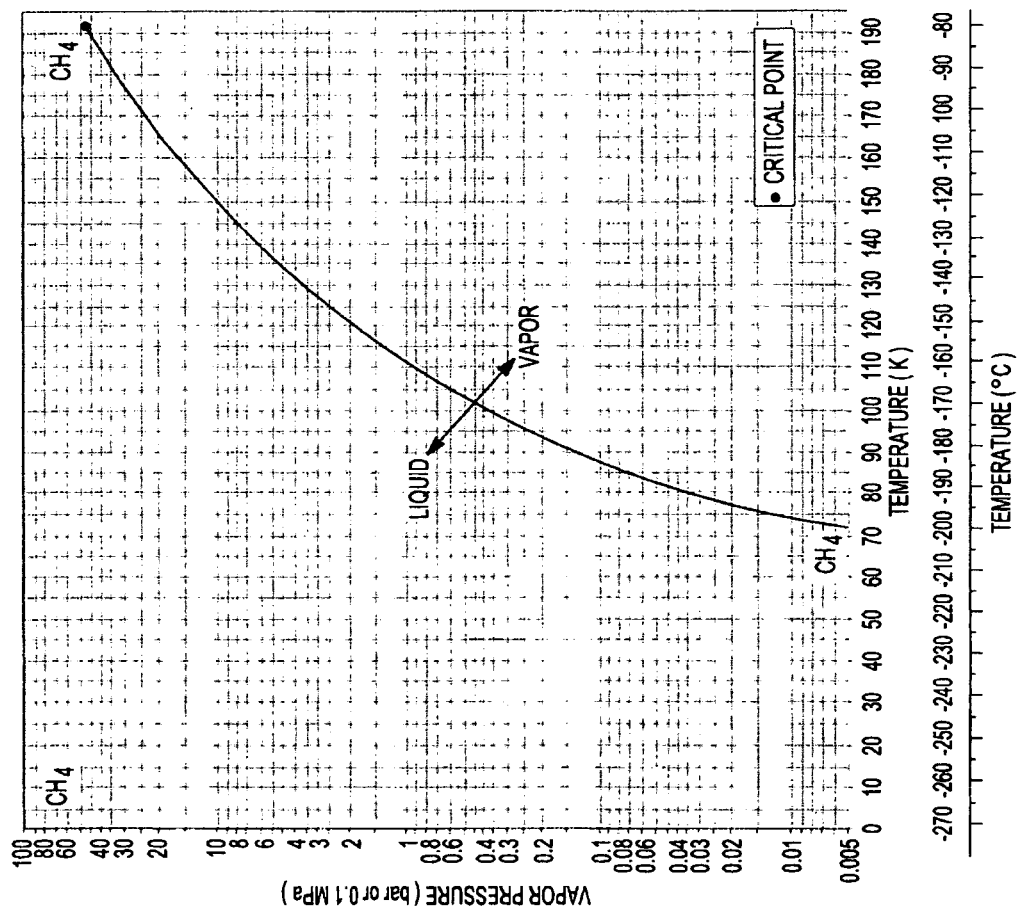
FIG. 7 is a plot illustrating the liquid-gas transition temperatures of methane.

The process may include one or more steps of removing gas from the chamber, one or more steps of separating one or more of the products that is generated by the plasma process, or both, so that some or all impurities are removed from the product being separated. For example, the process may include a step of separating a silane, a step of separating methane, a step of separating water, a step of separating one or more other molecules, or any combination thereof. Preferably, the process includes a step of separating silane gas from one or more other gases in the atmosphere of the plasma containing device, that is generated by the process, or both, so that the concentration of silane is increased. The separation step may employ any art know process for separating gases, liquids, solids, or any combination thereof. Without limitation, the step of separating may include a step of condensing, a step of reacting, a step of passing through a membrane, a step of distilling, or any combination thereof. With reference to FIG. 6, the process may include a step of separating silane that includes a step of condensing the silane. As such, the silane may start as a gas and the condensation may be effected by reducing the temperature, increasing the pressure, or both, so that the silane becomes a liquid. With reference to FIG. 7, the process may include a step of separating methane that includes a step of condensing the methane. As such, the methane may start as a gas and by reducing the temperature, increasing the pressure, or both, the methane may become a liquid. When separated, the silane preferably has a silane purity of at least about weight percent, more preferably at least about 99.9 weight percent, even more preferably at least about weight percent, and most preferably at least about 99.999 weight percent.

The process may also include a step of recovering one or more, or even all of the components of the hydrogen-containing gas (such as the hydrogen containing molecules, the inert gas, or both), preferably so that it may be recirculated and/or reused for generating a plasma. As illustrated in FIG. 2, the process may include a step of recovering a gas (such as water vapor) prior to a step of recovering the silane gas.

Performance of the Process

The process may generate silane gas at a relatively high rate such that the difference between the concentration of silane gas molecules in the atmosphere where the silane gas is generated and the concentration of silane gas molecules in the hydrogen-containing gas that is fed into the chamber is greater than about 0.01 mole percent, preferably greater than about 0.05 mole percent, more preferably greater than about 0.1 mole percent, even more preferably greater than about 0.2 mole percent, and most preferably greater than about 0.5 mole percent, based on the total number of molecules in each gas. The process may be characterized as a process that increases the concentration of silane gas in the atmosphere of the chamber preferably by at least 0.01 mole percent, more preferably at least about 0.1 mole percent, and most preferably by at least about 0.2 mole percent, based on the total number of atoms in the atmosphere of the chamber (e.g. compared to the initial atmosphere of the chamber, compared to the plasma input gas and the background input gas, if employed, or both).

Additional Features

In addition to, or instead of flowing a hydrogen-containing gas through a plasma generating divide (e.g., a plasma torch), the process may include a step of feeding particles of a silicon containing material into a plasma generating device, a step of a feeding a hydrocarbon material in a condensed state (e.g., a liquid or solid) into a plasma generating device; or both. The hydrocarbon material may be any hydrocarbon that is capable of generating a plasma containing a hydrogen plasma, that is capable of coating the silicon containing material, or both. Without limitation the hydrocarbon material may be an oligomer (e.g., a wax) or a polymer including, consisting substantially of (e.g., at a concentration of at least about 90 weight percent, preferably at a concentration of at least about 95 weight percent), or consisting entirely of hydrogen and carbon. Exemplary polymers that may be employed include polyolefins, For example, the process may include a step of feeding particles (such as coated particles) having a mean volume of less than 0.1 ml, preferably less than about 0.001 ml, and more preferably less than about 0.00001 ml.

Although the above processes refer to the generation of silane (i.e., $SiH_4$), it will be appreciated that the processes may generally be used to generate one, two, or more molecules having the general formulation $Si_xH_y$, where x and y are both integers ≥1, and preferably one, two, or more molecules having the general formula $Si_xH_{2x+2}$, where x is an integer 1. Without limitation, the process may generate silane, disilane, trisilane, or any combination thereof.

EXAMPLES

By way of example, various pathways to molecules having the general formulation $Si_xH_y$, $Si_xD_y$, and $Si_xH_yD_z$, where x, y and z are both integers ≥1 (e.g., silane), and derivatives therefrom are discussed. The following examples are for illustration purposes and should not be taken as limiting.

Example 1

A sample of metallic silica is placed in a magnetron plasma generating device (e.g., similar to the device illustrated in FIG. 3) which is in a chamber that is evacuated. The magnetron generator has an RF chuck located above the anode and separated from the anode. A flow of a gas consisting essentially of about 60 percent Argon and about 40 percent $H_2$ (i.e., the molecular ratio of Ar to $H_2$ is about 6:4) is added into the chamber. The pressure in the chamber is maintained at about 150 mTorr (i.e., about 20 Pa).

A witness plate (e.g., a sample of copper) is placed in the chamber away from the magnetron to collect atoms which may be in the atmosphere for later evaluation.

A Stanford Research Systems RGA-100 Residual Gas Analyzer (RGA) is used to directly sample gasses resident in the chamber. The RGA is a high-vacuum device which works by ionizing the gas and then accelerating the ions through a quadrupole mass spectrometer. The quadrupole mass spectrometer acts as a filter allowing only ions with certain charge-to-mass ratio to reach the detector. The output signal of the RGA consists of a collected current vs. charge-to-mass ratio spectrum is compared with known gas signatures. Since the pressure in the chamber exceeds the maximum operating pressure of the RGA, the RGA is differentially pumped through a needle valve which is adjusted to ensure a constant pressure of about $2.3 \times 10^{-5}$ Torr (i.e., about 0.0031 Pa). The RGA is configured to continuously scan from 1 through 100 atomic mass units.

To generate the plasma, a capacitance of about 200W is applied to the capacitive RF chuck and an inductance of about 200 W is applied to the inductive RF chuck. The composition of the atmosphere in the chamber, including the partial pressure of the silane is measured using the RGA. When the plasma and maintained for at least about 1 minute, partial pressure of silane, as measured by the primary signal for $SiH_4$ (i.e., about 31 atomic mass units) is increased by at least about $5 \times 10^{-8}$ Torr (i.e., at least about $6.7 \times 10^{-6}$ Pa) over the background signal. FIG. 8, illustrates the partial pressure (in units of Torr) of the silane, as measured by the primary signal as a function of time (in units of seconds). When the plasma is started 81, the partial pressure of silane increases and when the plasma is stopped 82, the partial pressure of silane begins to decrease. When the plasma is being generated, the concentration of silane gas in the chamber reaches about 0.25 mole percent, based on the total moles of gas in the chamber.

After the experiment, the witness plate is removed and evaluated using Energy Dispersive X-Ray Spectroscopy (EDS). The EDS spectrum is shown in FIG. 9, where the intensity is plotted against the x-ray energy. The witness plate clearly shows a peak corresponding to silicon metal and illustrates that Si(g) is generated by the plasma process.

Example 2

Example 2 is prepared using the same process as example 1, except the hydrogen-containing gas consists essentially of about 10 mole percent Argon an about 90 mole percent $H_2$ molecules (i.e., the molecular ratio of Ar to $H_2$ is about 1:9). When the plasma is generated, the concentration of silane gas in the chamber reaches about 0.89 mole percent, based on the total moles of gas in the chamber. The silane gas is recovered using a condenser, such as the one illustrated in FIG. 2, by cooling the gas below the liquid-vapor transition temperature of silane (as illustrated in FIG. 6), so that a "clean silane" liquid is produced having fewer impurities than the silane gas from which it is produced.

Examples 3-9

Examples 3-9 are prepared using the same process as in example 1, except the inductance is about 250 W; the capacitance is about 250 W; the pressure in the RGA is about $8 \times 10^{-5}$ Torr (e.g., about 0.011 Pa); and the hydrogen-containing gas consists essentially of argon and $H_2$ at a molecular ratio of about 1:9, about 2:8, about 3:7, about 4:6, about 5:5, about 5:4, and about 7:3 for Examples 3, 4, 5, 6, 7, 8, and 9 respectively. The change in the partial pressure of silane gas in the atmosphere of the chamber when the plasma is generated is illustrated in FIG. 10. FIG. 10 illustrates that at these conditions, as the ratio of Ar to $H_2$ decreases from 7:3 to 1:1, the partial pressure of silane generally increases and is maximum at a ratio of about 1:1.

Example 10

Example 10 is prepared using the same process as Example 1, except a rice hull ash that is compacted to a bulk density of about 1 g/cm$^3$ is used instead of the metallic silicon. Silane and methane gas are generated when the plasma is turned on. Further studies using a hydrogen-containing gas consisting essentially of argon and $H_2$ at different ratios, shows that at these conditions, a gas including about 60 mole percent argon and about 40 mole percent $H_2$ (based on the total number of molecules in the gas) produces the highest rate of silane generation.

Example 11

Example 11 is prepared using a plasma torch instead of a magnetron plasma generator. First, a sample of metallic silicon is placed in a chamber. The initial atmosphere in the chamber consists essentially of about 10 mole percent Ar and about 90 mole percent $H_2$ molecules (based on the total number of molecules in the gas). The pressure in the chamber is maintained at about 200 kPa. A hydrogen-containing gas consists essentially of about 10 mole percent Ar and about 90 mole percent $H_2$ molecules (based on the total number of molecules in the gas) is fed into the plasma torch. An inductive discharge is initiated within the torch to generate a plasma. Silane gas is expected to be generated by this process.

When the atmosphere in the chamber and the atmosphere in the hydrogen-containing gas are both changed to atmospheres that consist essentially of molecular hydrogen gas (i.e., $H_2$ gas), the process is expected to generate molecules including silane. When rice hull ash is used instead of the metallic silicon, the process is expected to generate molecules including water and silane, and optionally methane gas, methylsilane gas, or both. When particles of a silicon containing material are fed into a plasma torch along with a hydrogen-containing gas, the process is expected to generate molecules including silane. When particles of a silicon containing material that are coated with a solid hydrocarbon are fed through the plasma torch along with the hydrogen-containing gas, the process is expected to generate molecules including silane.

It should be understood that various ingredients or steps may be substituted, added or removed from the above processes without departing from the scope of the present invention. Moreover, it is contemplated that the weight percentages of the above ingredients and the values of the properties listed may vary up to or greater than ±5 percent, ±10 percent, ±25 percent or ±50 percent of the values listed. For example, a value of 10±10 percent results in a range of 9 to 11.

It will be further appreciated that functions or structures of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

It should be appreciated that the above referenced aspects and examples are non-limiting as others exist within the scope of the present invention, as shown and described herein. For example, any of the above mentioned aspects or features of the invention may be combined to form other unique configurations, as described herein, demonstrated in the drawings, or otherwise.

What is claimed is:

1. A process comprising the steps of:
providing a silicon containing material;
generating a plasma; and
contacting the plasma to the silicon containing material in a chamber having an atmosphere that includes atoms selected from the group consisting of hydrogen atoms, deuterium atoms and a mixture thereof to form molecules selected from the group consisting of $Si_xH_y$, $Si_xD_y$, $Si_xH_yD_z$ and mixtures thereof, where x, y and z are integers ≥1, H is hydrogen and D is deuterium.

2. The process of claim 1, wherein the molecules selected from the group consisting of $Si_xH_y$, $Si_xD_y$, $Si_xH_yD_z$ and mixtures thereof include molecules selected from the group consisting of silane, deuterated silane and mixtures thereof.

3. The process of claim 1, wherein the silicon containing material includes at least 20 weight percent silicon atoms based on the total weight of the silicon containing material.

4. The process of claim 1, wherein the step of contacting the plasma to the silicon containing material forms silicon atoms using a method selected from the group consisting of vaporizing silicon atoms, sputtering silicon atoms and combinations thereof.

5. The process of claim 1, wherein the atoms selected from the group consisting of hydrogen atoms, deuterium atoms and a mixture thereof come from molecules selected from the group consisting of hydrogen molecules, deuterium molecules, hydrogen deuteride molecules, hydrocarbons, deuterated hydrocarbons, and mixtures thereof.

6. The process of claim 1, further comprising the step of:
flowing a plasma input gas through a plasma generating device to generate the plasma, wherein the plasma input gas includes molecules selected from the group consisting of hydrogen molecules, deuterium molecules, hydrogen deuteride molecules, hydrocarbons, deuterated hydrocarbons and combinations thereof.

7. The process of claim 2 further comprising the steps of:
removing an output gas including molecules selected from the group consisting of silane, deuterated silane and mixtures thereof from the chamber; and
separating the molecules from at least one impurity.

8. The process of claim 1 wherein the plasma is selected from the group consisting of a hydrogen plasma, a deuterium plasma and combinations thereof and further comprising the steps of:
contacting the plasma with the silicon containing material to generate silicon gas; and
reacting the silicon gas with a reactant selected from the group consisting of a hydrogen atom, a hydrogen molecule, a hydrogen ion, a deuterium atom, a deuterium molecule, a hydrogen deuteride molecule, a deuterium ion, a hydrocarbon, a deuterated hydrocarbon and combinations thereof to at least one molecule consisting of a silicon atom and one or more atoms selected from the group consisting of hydrogen atoms and deuterium atoms.

9. The process of claim 1 wherein the silicon containing material includes a metal containing at least about 50 mole percent silicon atoms.

10. The process of claim 1 wherein the chamber has an atmosphere including at least about 1 mole percent atoms selected from the group consisting of hydrogen atoms and deuterium atoms.

11. The process of claim 1 comprising the step of:
feeding a background gas into the chamber wherein the background gas includes atoms selected from the group consisting of hydrogen atoms, deuterium atoms and combinations thereof.

12. The process of claim 6 wherein the plasma input gas comprises at least about 90 mole percent atoms selected from the group consisting of hydrogen atoms, deuterium atoms and combinations thereof.

13. The process of claim 1, wherein the chamber has an atmosphere containing less than about 20 weight percent oxygen.

14. The process of claim 1, wherein the chamber has an atmosphere including an absolute partial pressure of molecules selected from the group consisting of hydrogen molecules, deuterium molecules, hydrogen deuteride molecules and mixtures thereof greater than about 0.001 kPa.

15. The process of claim 1, wherein the chamber has an atmosphere having an absolute pressure from about 0.001 kPa to about 10 MPa.

16. The process of claim 6, further comprises the steps of:
condensing the molecules selected from the group consisting of silane, deuterated silane and combinations thereof, wherein the at least one impurity is selected from the group consisting of hydrogen molecules, deuterium molecules, hydrogen deuteride molecules and mixtures thereof; and
re-circulating the at least one impurity into the chamber.

17. The process of claim 1 further comprising the step of:
converting the molecules selected from the group consisting of $Si_xH_y$, $SI_xD_y$, $Si_xH_yD_z$ and mixtures thereof into high purity silicon.

18. The process of claim 1 further comprising the step of:
increasing the concentration of silane gas in the atmosphere of the chamber by at least 0.01 mole % based on the total number of atoms in the atmosphere of the chamber.

19. The process of claim 1, wherein the chamber has an atmosphere that contains less than about 60 weight percent nitrogen.

20. The process of claim 6, wherein the plasma input gas includes an inert gas present at a concentration of at least about 0.01 mole percent, based on the total concentration of atoms in the plasma input gas, wherein the inert gas includes atoms selected from the group consisting of helium, neon, argon, krypton, and xenon.

21. The process of claim 1 wherein the chamber has an atmosphere that includes at least about 0.01 percent inert gas atoms.

22. The process of claim 6 wherein the plasma input gas has a total concentration of atoms selected from the group consisting of hydrogen atoms, deuterium atoms and combinations thereof, and inert gas atoms greater than about 90 mole percent.

23. The process of claim 1 further comprising the step of:
feeding particles of the silicon containing material into a plasma torch, wherein the particles have a mean volume of less than 0.1 ml.

24. The process of claim 23, wherein the silicon containing material further comprises a hydrocarbon.

25. The process of claim 1 further comprising the step of:
feeding a hydrocarbon material in a condensed state into a plasma torch.

26. The process of claim 25, wherein the hydrocarbon material has a mean particle volume of less than 0.1 ml.

27. A method for providing a high purity silicon comprising the steps of:

providing an agricultural waste product having amorphous silica, carbon, and impurities;
extracting from the agricultural waste product an amount of the impurities;
changing the ratio of carbon to silica, thereby forming a cleaned agricultural waste product having a ratio of carbon to silica that ranges from about 2:1 to about 10:1; and
reducing the silica to form a photovoltaic silicon,
wherein in the reducing step, the cleaned agricultural waste product is exposed to a hydrogen plasma to form silane.

28. A process for generating a molecule selected from the group consisting of the formula $Si_xH_y$, $Si_xD_y$, $Si_xH_yD_z$, and mixtures thereof, where x,y and z are integers $\geq 1$, H is hydrogen and D is deuterium, comprising the steps of:
providing a silicon containing material, wherein the silicon containing material includes metallic silicon, an agricultural waste product or other silicon containing material; and
contacting a plasma to the silicon containing material in an environment with an appreciable content of atoms selected from the group consisting of hydrogen, deuterium and mixtures thereof to generate the molecule, wherein the plasma is capable of vaporizing a silicon atom, sputtering a silicon atom, or both.

29. A process for generating silane comprising the steps of:
flowing a gas containing atoms selected from the group consisting of hydrogen atoms, deuterium atoms, and mixtures thereof through a plasma generating device to generate a plasma selected from the group consisting of a hydrogen plasma, a deuterium plasma and a combination thereof;
contacting the plasma with a silicon containing material to generate silicon gas; and
reacting the silicon gas with at least one hydrogen atom, at least one hydrogen molecule, at least one hydrogen ion, at least one deuterium atom, at least one deuterium molecule, at least one hydrogen deuteride molecule, at least one deuterium ion or any combination thereof, to form one or more molecules consisting of at least one silicon atom and at least one hydrogen atom or at least one deuterium atom,
wherein the gas has at least 0.5 percent hydrogen atoms, deuterium atoms or a combination thereof based on the total number of atoms in the gas.

* * * * *